UNITED STATES PATENT OFFICE.

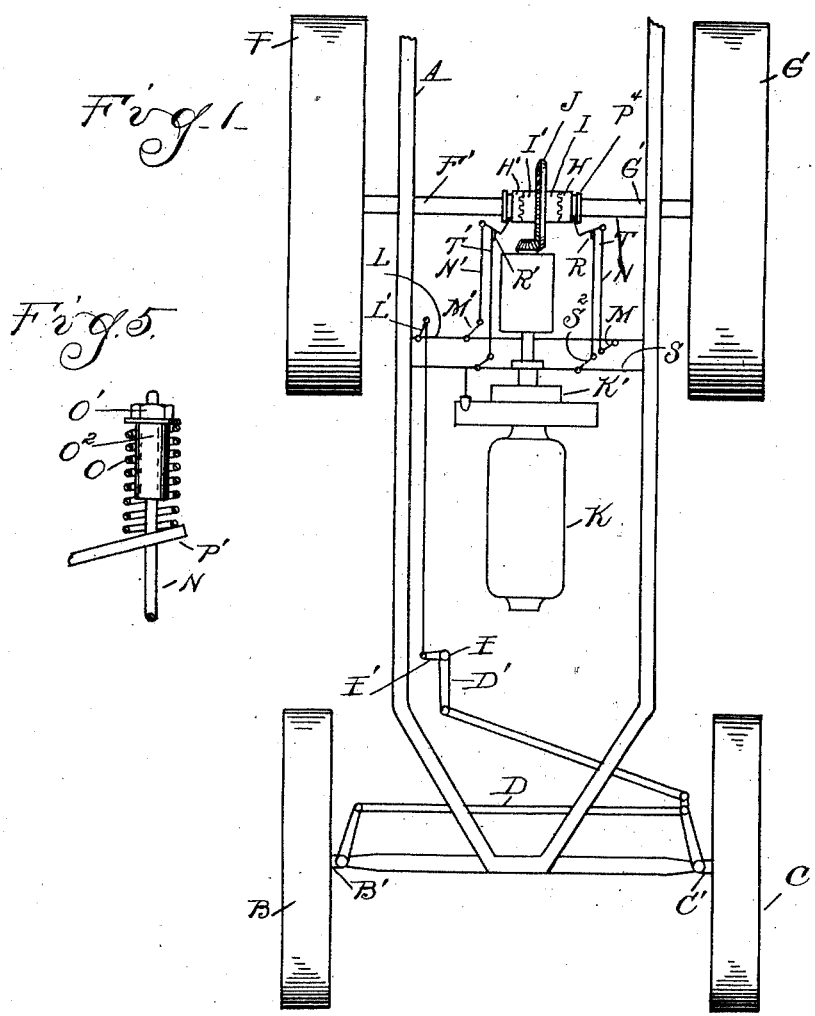

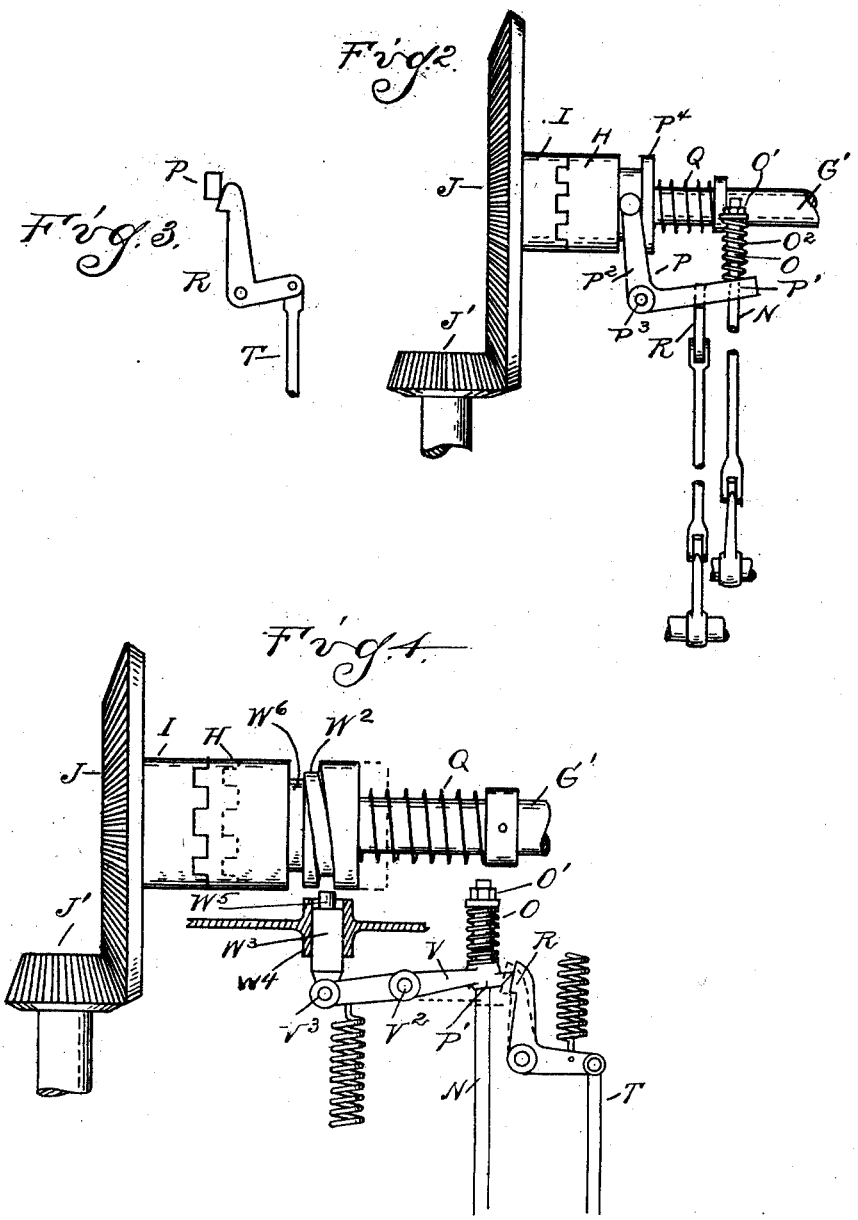

GEORGE W. DUNHAM, OF DETROIT, MICHIGAN.

DECLUTCHING MECHANISM.

1,367,309. Specification of Letters Patent. Patented Feb. 1, 1921.

Application filed April 7, 1916. Serial No. 89,584.

*To all whom it may concern:*

Be it known that I, GEORGE W. DUNHAM, a citizen of the United States of America, residing at Detroit, in the county of Wayne and State of Michigan, have invented certain new and useful Improvements in Declutching Mechanism, of which the following is a specification, reference being had therein to the accompanying drawings.

This invention relates to declutching mechanism for tractors and the like, and refers more particularly to an improved construction for automatically rendering idle the inner drive wheel and placing the entire driving force on the outer driving wheel when the tractor is turning a corner.

Among the objects of the invention are to provide a construction suitable for use in tractors or other vehicles designed for heavy work, which will displace the differential usually employed in power-driven vehicles, and will permit the tractor to negotiate a sharp turn; to so construct and arrange the parts that the inner drive wheel will be automatically declutched from the drive shaft upon adjustment of the steering mechanism in turning a corner; to provide a construction in which positive clutches can be employed and the reëngagement of the clutches controlled by the operation of the engine clutch so that when either of the wheels has been declutched, the clutch parts cannot be reëngaged until the drive shaft is disconnected from its source of power; to utilize the normal controlling devices, such as the steering mechanism and the engine clutch pedal for automatically governing the declutching and clutching of the drive wheels; to provide positively actuated means for operating the declutching mechanism; and in general to provide an improved and simplified construction of the character referred to. Further features of the invention reside in such details of construction and combinations and arrangement of parts as will more fully hereinafter appear.

In the drawings:

Figure 1 is a diagrammatic view of the tractor mechanism embodying my invention;

Fig. 2 is an enlarged detail view of the clutch mechanism;

Fig. 3 is a fragmentary elevational view of parts shown in Fig. 2.

Fig. 4 is a view similar to Fig. 2 showing a modified construction;

Fig. 5 is a fragmentary sectional view through one of the springs shown in Fig. 2.

In the diagrammatic view A designates the frame and B and C the front steering wheels. These wheels are mounted on stub axles B' and C' and are turned by the usual steering mechanism D connected by a rock-arm D' to the steering post E. At the rear the tractor is provided with driving wheels F and G fixed to the axle shafts F' and G' respectively. These shafts extend only to the center of the axle proper and are provided with positive clutches H and H', and coöperating members I and I', which are rigidly secured to the respective sides of a large bevel gear J. As the operation of both of the positive clutches is similar, I will only describe in detail the operation of the clutch H. The bevel gear J is driven by a bevel pinion J' which in turn is connected to the engine K through the usual engine clutch K'. The operation of this clutch K' is utilized for controlling the reëngagement of the clutches H and H' in the manner hereinafter described, while the adjustment of the steering mechanism is employed for governing the declutching of the drive wheels, as follows:

An arm E' on the steering post E is connected by means of a rock-arm L' to the rock-shaft L so that when the steering post E is turned in one direction, the shaft L will be rocked forwardly about its axis, while upon the adjustment of the steering mechanism to turn the steering wheels in the opposite direction, the shaft L will be rocked rearwardly. Fixedly secured to the rock-shaft L is an upwardly extending lever arm M' and a downwardly extending arm M pivotally connected to rods N' and N respectively.

Sleeved upon each of these rods is a spiral spring O and a stop member such as the tube $O^2$, positioned between the adjusting nut O' and the end P' of the rock arm P. The latter is pivoted at $P^3$ and has its other arm $P^2$ operatively connected to a collar $P^4$ in the clutch H, there being of course a similar arrangement for the clutch H'. Normally the clutch operating mechanisms are in the position shown in Fig. 2, the clutch member H being spring pressed into engagement with the operating clutch member I by a suitable spring Q.

Assuming now that the tractor starts to negotiate a corner toward the left, the automatic declutching of the inner drive wheel is as follows. The adjustment of the steering mechanism to turn the front wheels toward the left will, through the connection between the steering mechanism and the shaft L, cause the arm M to rock forwardly carrying with it the rod N and adjusting nut O'. This will compress the spring O until the positive stop $O^2$ comes into operation, and acting on the end P' of the arm P rocks the latter about its pivot and positively withdraws the clutch H from the clutch I. Immediately the teeth of the clutch H become disengaged, the spring O which is stronger than the spring Q will overcome the latter and pull the clutch member H entirely and cleanly out of engagement, moving it back sufficiently far for the pawl or catch R to catch under the rock arm P.

This pawl or catch R is for the purpose of preventing the clutch mechanism from springing back into engagement, until the drive shaft and bevel gear J are declutched from the engine. Otherwise when the tractor is again straightened back into its course, there would be a clattering produced by the faces of the clutch members grinding over each other and also danger of excessive wear or injury to the clutch parts. In the present construction this is prevented by governing the release for the pawl R from control mechanism directly connected to the rock-shaft S of the engine clutch release.

In detail the shaft S is provided with arms $S^2$ connected through rods T and T' to the pawls R and R', the arrangement being such that when the shaft is rocked to disengage the engine clutch, it will simultaneously release the pawls and allow whichever clutch has been held out, to again engage. After straightening the tractor back into its course, should the driver forget to release the clutch, no harm will be done, since all the driving would then simply be upon one wheel. Under certain conditions the traction of the one wheel would be insufficient, allowing this wheel to spin and thus calling the driver's attention to the fact that one wheel was inoperative. It would then only be necessary to release the engine clutch by pressing on the foot-pedal usually employed with such clutches, so as to permit both wheels to again become locked.

In some cases, particularly in connection with heavy tractors or trucks, the drive through the inner wheel when turning a corner may make difficult the manual operation of the declutching mechanism. I therefore provide means (as shown in Fig. 4) for utilizing the power of the engine for positively withdrawing the movable clutch member of the inner wheel. In this construction the arm V is pivoted at $V^2$ intermediate its ends, and has its outer end $V^3$ pivotally connected to a reciprocating plunger $W^3$. This plunger is mounted in a suitable guide-way $W^4$ and at its inner end has a pin $W^5$ adapted to engage a cam groove $W^2$, whenever the forward movement of the rod N causes the lever V to rock about its pivot $V^2$. After the pin $W^5$ has been engaged with the groove $W^2$, the continued rotation of the clutch member H will cause the teeth of the latter to be positively disengaged from the teeth of the coöperating clutch member I. When the clutch is thus withdrawn it is prevented by the catch R from springing back into engagement until the driving shaft is disconnected from the engine in a manner similar to that described in connection with Fig. 2.

From the above description it will be noticed that positive means, either manually operated or power driven, are employed for producing the automatic declutching of the inner drive wheel when turning the corner, and the operation is automatically controlled by the steering of the vehicle; also that the present novel arrangement of controlling the reëngagement of the clutch, permits the use of positive clutches without any danger of their springing back into engagement while under load. The invention, however, is not limited to the construction shown except as specified in the appended claims.

In the construction shown in Fig. 4 a groove $W^6$ is cut below the bottom of the threaded groove $W^2$ so that when the pin $W^5$ reaches the inner end of the groove $W^2$ it drops into the groove $W^6$. This prevents the clutch jumping back and forth as the pin passes over the end of the threaded groove $W^2$.

What I claim as my invention is:

1. The combination with a driving member, drive wheels, and means for clutching said drive wheels to said driving member, of means for declutching the inner wheel when turning a corner, and means for preventing reëngagement of said clutching means except when the driving member is disconnected from its source of power.

2. The combination with a driving member, drive wheels, and means for clutching said drive wheels to said driving member, of a steering mechanism, means controlled by the operation of said steering mechanism for automatically declutching the inner wheel when turning a corner, and means for preventing reëngagement of said clutching means except when the driving member is disconnected from its source of power.

3. The combination with a driving member, drive wheels, and means for clutching said drive wheels to said driving member, means for declutching the inner wheel when turning a corner, means for disconnecting the driving member from its source of power, and mechanism controlled thereby for preventing reëngagement of the wheel clutches except when the driving member is disconnected from the source of power.

4. The combination with a driving member, drive wheels, and means for positively clutching said drive wheels to said driving member, of steering mechanism, and means utilizing the power of the driving member and mechanically controlled by the adjustment of the steering mechanism for positively declutching the inner wheel when turning a corner.

5. The combination with a driving member, drive wheels, and means for positively clutching said drive wheels to said driving member, of steering mechanism, and power driven mechanism, mechanically controlled by the adjustment of said steering mechanism, for declutching the inner wheel when turning a corner.

6. The combination with a driving member, drive wheels, and means for positively clutching said drive wheels to said driving member, steering mechanism, mechanism controlled by the adjustment of said steering mechanism for automatically declutching the inner wheel, an engine clutch for declutching the driving member, and means for preventing reëngagement of the clutching mechanism for the inner wheel except when the driving member is declutched.

7. The combination with an engine, a driving member, a clutch for connecting the driving member to the engine, drive wheels, and means for clutching said drive wheels to said driving member, of mechanism for declutching the inner wheel when turning the corner, and mechanism for controlling the reëngagement of the clutch mechanism for the inner wheel controlled by the operation of the clutch which connects the driving member to the engine.

8. The combination with a driving member, drive wheels, clutch members therebetween having interengaging clutch teeth, and automatically controlled declutching mechanism comprising positive means for initially disengaging said clutch teeth, and means for springing said clutch members farther apart when the clutch teeth are disengaged.

9. The combination with a driving member, drive wheels, and means for clutching said drive wheels to said driving member, said means provided with cam grooves, of steering mechanism, and means automatically controlled by the adjustment of the steering mechanism for declutching the inner drive wheel when turning a corner, said declutching means including members movable transversely of said clutching means and into engagement with said cam grooves.

10. The combination with a driving member, of drive wheels, movable clutches between said driving member and drive wheels, said clutches having cam grooves therein, members movable transversely of said clutches and adapted to engage in the outer ends of said cam grooves, steering mechanism, and connections between said members and steering mechanism for moving one of said members into engagement with its respective groove upon adjustment of said steering mechanism, whereby said adjusted member will move its clutch outwardly from engagement with said driving member.

In testimony whereof I affix my signature in the presence of two witnesses.

GEORGE W. DUNHAM.

Witnesses:
J. F. LOOP,
CARL E. GREGORY.